UNITED STATES PATENT OFFICE.

EDWARD MARTIN BECK, OF AKRON, OHIO.

PROCESS OF MANUFACTURING GUMS FOR VARNISHES, &c.

SPECIFICATION forming part of Letters Patent No. 627,452, dated June 20, 1899.

Application filed July 19, 1897. Renewed November 19, 1898. Serial No. 696,864. (No specimens.)

*To all whom it may concern:*

Be it known that I, EDWARD MARTIN BECK, a citizen of the United States, residing at Akron, in the county of Summit and State of Ohio, have invented certain new and useful Improvements in Processes of Manufacturing Gums for Varnishes, &c.; and I do hereby declare the following to be a full, clear, and exact description of the invention, such as will enable others skilled in the art to which it appertains to make and use the same.

This invention relates to the process of manufacturing the artificial varnish-gum such as is disclosed in my copending application, Serial No. 645,142, filed July 19, 1897.

The primary object of the invention is to provide a simple and efficient process of manufacturing an artificial varnish-gum from rosin and wood-oil, either with or without another ingredient or ingredients, which will promote hardening and drying qualities and prevent granulation, such gum being adapted to be employed as a substitute for the more expensive natural varnish-gums heretofore used in the manufacture of varnishes and for other purposes, whereby the artificial gum may be readily and economically made in order to reduce the cost of manufacture of varnishes.

The invention will be hereinafter more particularly described and then pointed out in the claims at the end of the description.

In carrying out my process I place in a kettle or other receptacle, heated by any suitable means, about five hundred pounds of rosin and heat the same to a temperature of about 400° Fahrenheit. I then add to the melted rosin about thirty-seven pounds of air-slaked lime, suitably stirring the mass to thoroughly incorporate the ingredients, after which the temperature may be raised to about 525° Fahrenheit, at which temperature the mixture may be maintained for about three hours, the stirring being continued. About ten pounds of a suitable drier, as sugar of lead, may now be added to the mixture, which while being stirred is boiled at the last-mentioned temperature for about one-half hour longer, after which may be added about one hundred and eighty-eight pounds of wood-oil—*i. e.*, oil obtained from the nuts or seeds of the tree known botanically as *Aleurites cordata*, which is grown principally in China and the adjacent islands. This oil is preferably used in the raw state and the addition thereof reduces the temperature of the combined ingredients in the receptacle to about 425° Fahrenheit, at which time about eight pounds additional of air-slaked lime or other suitable ingredient or ingredients, which will promote the hardening and drying qualities and prevent granulation, may be added to the mixture and the whole mass kept at a temperature of about 425° Fahrenheit for about one and one-half hours longer. The stirring is continued all the time or at very frequent intervals until the process is completed, when the kettle or other receptacle is removed or the heat shut off, so as to permit the mass to cool and harden, and the gum may then be removed in any suitable manner for use or for other purposes. The gum thus produced by mixing rosin with the oil of *Aleurites cordata* can be sold for considerably less than the average natural varnish-gums heretofore used, and may be employed as a substitute for the natural gums in the manufacture of varnish and other purposes in the arts with greater economy and less expense and at the same time the beneficial qualities and advantages of the natural gums are realized.

I thus provide a simple and efficient process whereby a gum or compound may be readily and cheaply made, which is adapted to be sold as an article of manufacture and to be employed as a substitute for natural gums in the manufacture of varnishes or for other purposes.

The use of a suitable ingredient or ingredients to promote the hardening and drying qualities of the compound, as hereinbefore stated, is preferable, and such ingredients are usually employed, because of the more beneficial results obtained; but they may be omitted without departing from the spirit of my invention, which in its broader aspects comprises, essentially, a process of manufacturing a compound for varnishes, &c., from rosin and wood-oil treated in the manner hereinbefore described, either with or without such ingredients.

In this application I do not claim the gum or product which may be made by the herein-described process, as such forms the subjectmatter of my separate application hereinbefore referred to.

Having thus fully described my invention, what I claim as new, and desire to secure by Letters Patent of the United States, is—

1. The process of manufacturing a compound for varnishes, &c., which consists in liquefying a quantity of rosin, adding and mixing therewith a quantity of oil obtained from the tree known as *Aleurites cordata* and then boiling the mixture and stirring the mixture during the process, substantially as described.

2. The process of manufacturing a gum for varnishes and the like, which consists in boiling a suitable quantity of rosin, adding thereto a suitable drier, mixing therewith a quantity of oil obtained from the nuts or seeds of the *Aleurites cordata*, boiling the mixture for a suitable length of time, stirring the mass substantially continuously while it is being heated or cooked, and finally permitting the mass to harden, substantially as described.

3. The process of manufacturing a gum for varnishes, &c., which consists in subjecting a quantity of rosin to sufficient heat to liquefy the same, mixing therewith a suitable ingredient or ingredients to promote hardening and drying qualities and prevent granulation, raising the temperature to considerably above the boiling-point of the rosin and maintaining the heat for a suitable length of time, then adding a quantity of suitable oil, boiling the mixture at a lower temperature, and finally permitting the mass to harden, substantially as described.

4. The process of manufacturing a gum for varnishes and for other purposes, which consists in boiling a quantity of rosin, adding thereto a suitable quantity of air-slaked lime, raising the temperature thereof considerably above the boiling-point of the rosin and maintaining this temperature for a suitable fraction of a day, adding thereto a quantity of sugar of lead, then mixing a quantity of the oil obtained from the *Aleurites cordata*, and finally permitting the mass to harden, substantially as described.

5. The process of manufacturing a gum for varnish and for other purposes, which consists in heating a quantity of rosin to about 400° Fahrenheit, then adding a quantity of air-slaked lime thereto and continuously stirring the mass during the remainder of its treatment, raising the temperature to about 525° Fahrenheit and maintaining this temperature for about three hours, then adding thereto sugar of lead, boiling the ingredients for about one-half hour longer, adding a quantity of raw oil obtained from the nuts or seeds of the *Aleurites cordata*, adding thereto an additional quantity of air-slaked lime, then boiling the mixture at about 425° Fahrenheit for about one and one-half hours, and finally permitting the mass to harden, substantially as described.

In testimony whereof I affix my signature in the presence of two witnesses.

EDWARD MARTIN BECK.

Witnesses:
GEO. G. ALLEN,
J. H. McCRUMY.